United States Patent [19]

Nakazawa et al.

[11] Patent Number: 4,750,060
[45] Date of Patent: Jun. 7, 1988

[54] RECORDING APPARATUS

[75] Inventors: Toshihiko Nakazawa; Hiroyuki Takimoto; Kazumitsu Tobe, all of Kanagawa, Japan

[73] Assignee: Canon Kabushiki Kaisha, Tokyo, Japan

[21] Appl. No.: 841,011

[22] Filed: Mar. 14, 1986

Related U.S. Application Data

[63] Continuation of Ser. No. 810,521, Dec. 11, 1985, abandoned, which is a continuation of Ser. No. 715,600, Mar. 25, 1985, abandoned, which is a continuation of Ser. No. 435,382, Oct. 20, 1982, abandoned.

[30] Foreign Application Priority Data

| Oct. 28, 1981 | [JP] | Japan | 56-173535 |
| Nov. 10, 1981 | [JP] | Japan | 56-180200 |
| Nov. 10, 1981 | [JP] | Japan | 56-180201 |
| Nov. 10, 1981 | [JP] | Japan | 56-180202 |
| Nov. 25, 1981 | [JP] | Japan | 56-188918 |
| Nov. 27, 1981 | [JP] | Japan | 56-191195 |
| Nov. 27, 1981 | [JP] | Japan | 56-191196 |
| Dec. 2, 1981 | [JP] | Japan | 56-194185 |
| Dec. 2, 1981 | [JP] | Japan | 56-194186 |

[51] Int. Cl.$^4$ .................. G11B 5/03; G11B 15/12
[52] U.S. Cl. ........................ 360/66; 360/63
[58] Field of Search ...................... 360/66, 63

[56] References Cited

U.S. PATENT DOCUMENTS

| 3,342,949 | 9/1967 | Wessels | 360/66 |
| 3,478,177 | 11/1969 | Morita | 360/66 |
| 3,495,047 | 2/1970 | Atsumi et al. | 360/43 |
| 4,198,662 | 4/1980 | Schopper | 360/63 |
| 4,356,520 | 10/1982 | Yanagida | 360/63 |

Primary Examiner—Vincent P. Canney
Attorney, Agent, or Firm—Toren, McGeady & Associates

[57] ABSTRACT

A recording apparatus has a plurality of erasing heads arrayed aslant to the direction in which a strip-like recording medium is to be transported. An erasing operation on recorded information on the recording medium obliquely begins and obliquely ends by switching the erasing heads on and off one after another along an oblique recording track on the recording medium to accomplish information editing without introducing noises.

8 Claims, 19 Drawing Sheets

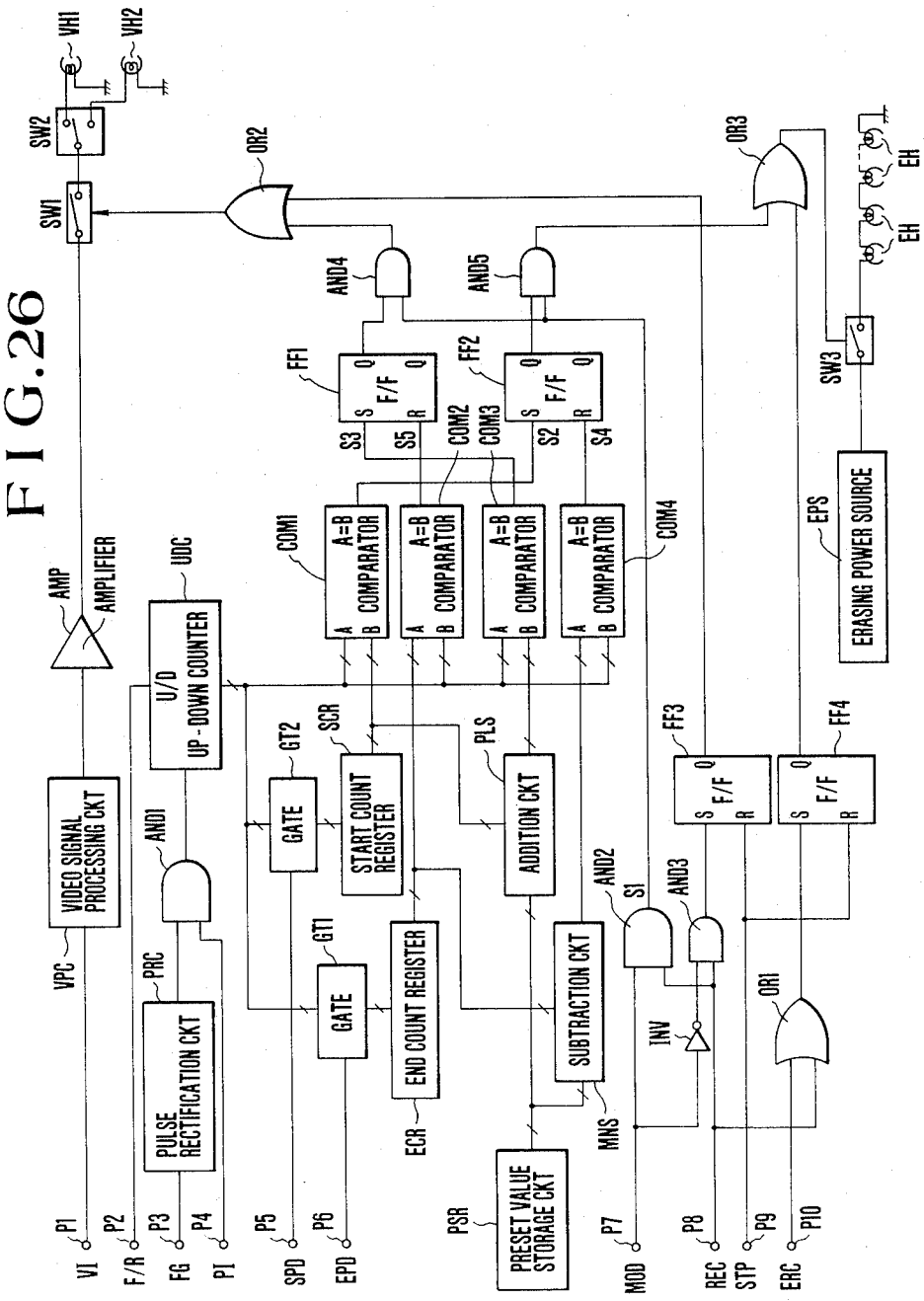
F I G. 26

F I G. 32
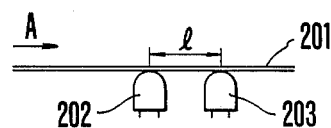
F I G. 33
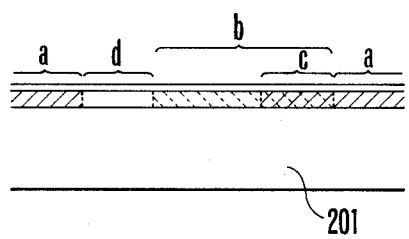
F I G. 34
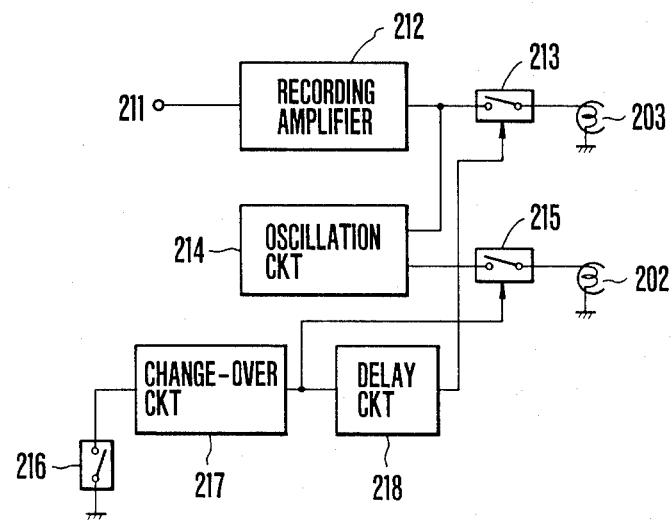

RECORDING APPARATUS

This is a continuation of application Ser. No. 810,521, filed Dec. 11, 1985, which was a continuation of application Ser. No. 715,600, filed Mar. 25, 1985, which was a continuation of application Ser. No. 435,382, filed Oct. 20, 1982, now all abandoned.

BACKGROUND OF THE INVENTION

1. Field of the Invention

This invention relates to a recording apparatus for recording information such as a video signal or the like on a strip-like recording medium and more particularly to a recording apparatus having recording means which obliquely performs recording on the recording medium at a given angle to the direction in which the medium is transported. The invention further relates to a recording apparatus having erasing means suited for editing the information.

2. Description of the Prior Art

Recording apparatuses of the type having recording means which obliquely perform recording on a recording medium at a given angle to the recording medium transporting direction have been known by the name of helical scanning recording apparatuses. The conventional recording apparatuses of this type have been using a whole width erasing head which is provided with a gap extending over the whole width of a recording tape. When such an erasing head is used, the oblique recording track of a signal recorded becomes as shown in FIGS. 1 and 2 of the accompanying drawings. Referring to these drawings, a reference numeral 11 denotes a magnetic recording tape; 11A a video signal recording part 11B a control track; 11C a voice track; 12 an erased part; 13 a recorded part; and 14 oblique record tracks. A reference symbol TS denotes an erasure starting end; TE an erasure terminating end; and An an arrow showing the direction in which the magnetic tape is being transported. As shown in FIGS. 1 and 2, the erasure starting and terminating ends TS and TE respectively intersect a plurality of oblique recording tracks (hereinafter called slant tracks).

Therefore, in recording a new signal, the slant track of the new signal either overlaps a partly erased slant track or leaves a blank space on the tape. In the former case, a beat noise tends to occur because the record signal is recorded in the form of a frequency or a phase modulated wave. In the latter case, an intermittent signal is reproduced with a no-signal noise occurring at discontinued parts of the signal. Therefore, it is hardly possible to edit a series of signals including no noise therein.

To solve this problem, there has been proposed an apparatus having a flying erasing head which rotates on a plane parallel with the rotation plane of a recording head and which erases the same track as the trace of the recording head. However, such an apparatus is not only every expensive but also presents a problem with respect to precision required for mounting.

Furthermore, in editing the voice and video records of a video tape recorder (hereinafter called VTR) or in editing the voice records of an audio tape recorder, the timing for supplying a current to one head and the timing for cutting off a current supply to another have been simultaneously effected because of the difference between the audio recording reproducing head and the erasing head in their mechanical positions. Accordingly, there is another problem in that the voice signals overlap at the start of editing and a part to be erased remains unerased at the end of editing.

It is an object of the present invention to provide a recording apparatus which solves the above stated problems of the prior art with the border lines between erasing and non-erasing parts at the erasure starting end TS and the erasure terminating end TE substantially along the slant tracks.

It is another object of the invention to provide a recording apparatus which is highly suited for editing when connecting and inserting records.

It is a further object of the invention to provide a recording apparatus which ensures that a part which is to be newly recorded be satisfactorily connected to an existing recorded part when editing records on a strip-like recording medium.

These and further objects and features of the invention will become apparent from the following detailed description of the preferred embodiments thereof taken in conjunction with the accompanying drawings.

SUMMARY OF THE INVENTION

These and other objects of the invention may be attained in a recording apparatus which includes recording means for recording a signal on a strip-like recording medium where the recording means is arranged to obliquely perform recording at a predetermined angle to the traveling direction of the recording medium. A plurality of erasing heads are arranged in the direction of the width of the recording medium and control means are provided for rendering the erasing heads operative sequentially.

BRIEF DESCRIPTION OF THE DRAWINGS

FIG. 26 is a circuit diagram showing a control circuit for editing video signals.

FIG. 32 is an illustration of a positional relation between a voice erasing head and a voice recording head.

FIG. 33 is an illustration of a voice recording track.

FIG. 34 is a circuit diagram showing a control circuit for editing a voice signal.

DETAILED DESCRIPTION OF THE PREFERRED EMBODIMENTS

Figure 1:
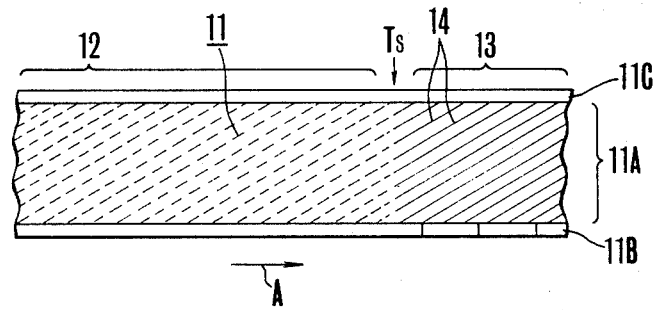
FIGS. 1 and 2 are illustrations showing recording and erasing accomplished on a magnetic recording tape by the conventional erasing head.
Figure 2:
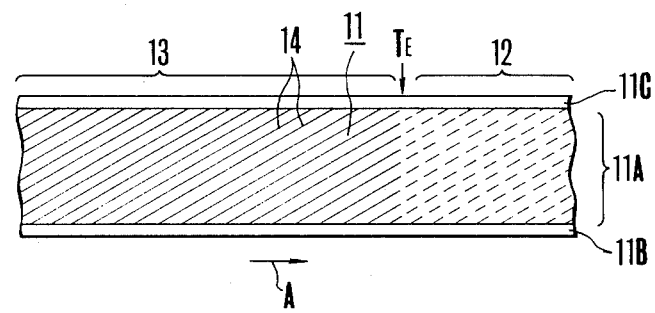
Figure 3:
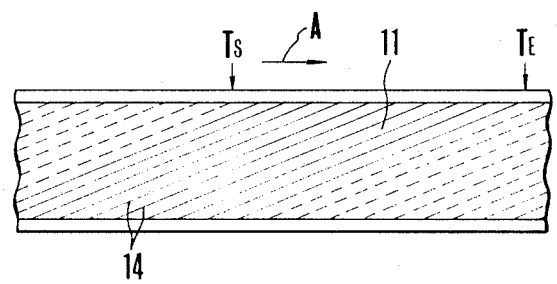
FIG. 3 shows recording and erasure accomplished on a magnetic recording tape in accordance with the present invention.
Figure 4:
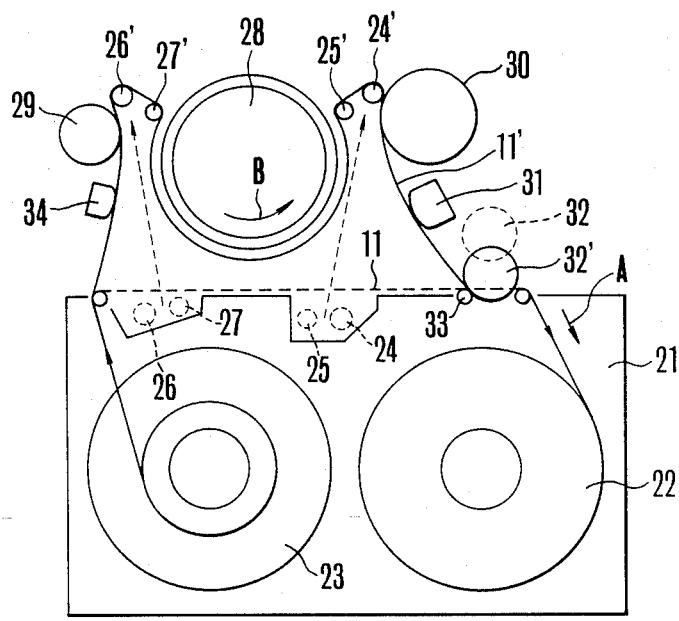
FIG. 4 is a plan view showing a VTR embodying the invention.

FIG. 4 is a plan view showing a home cassette type magnetic recording and/or reproducing apparatus (hereinafter called VTR) as a first embodiment of the invention. This VTR includes a cassette 21 containing the magnetic recording tape 11 therein; a take-up reel 22; a feed reel 23; guide pins 24-27 for loading including vertical guide pins 24 and 26 and slanting guide pins 25 and 27; a slanting cylinder 28 containing therein recording and reproducing rotary magnetic heads; impedance rollers 29 and 30; a voice and control signal head 31; a pinch roller 32; a capstan 33 and an erasing head 34. Since the operation of these components of the VTR is well known, it will be described briefly below:

With the VTR loaded with the cassette 21, the tape 11 and the guide pins 24-27 are in their positions respectively indicated by broken lines. After that, the operation of a loading motor (not shown) causes the guide pins 24-27 to move to their positions 24'-27' indicated by full lines. This brings the tape 11 into contact with the slanting cylinder 28 as indicated by a full line. When either a recording mode or a reproducing mode is selected, the pinch roller 32 moves from its broken line position to its full line position 32' to have the tape 11 transported in the direction of arrow A.

Figure 5:
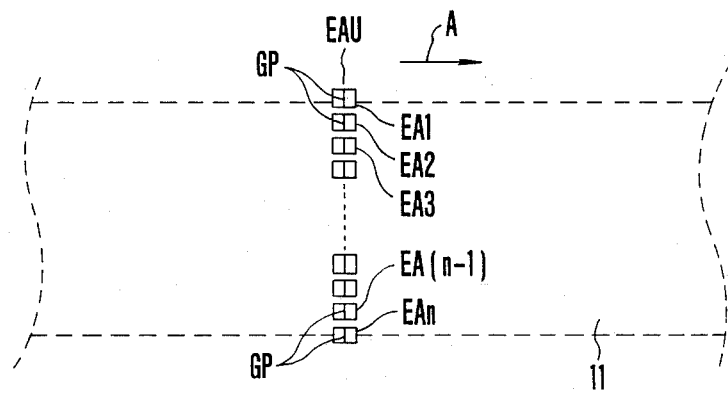
FIG. 5 is a schematic view showing erasing heads as a first embodiment of the invention.

In the first embodiment of the invention, the erasing head 34 is as shown in FIG. 5. The erasing head 34 consists of a multiple erasing head unit EAU including a plurality of erasing heads EA1-EAn.

The erasing heads EA1-EAn are in a row perpendicular to the tape transporting direction (arrow A). A gap GP of each of these erasing heads EA1-EAn extends perpendicular to the transporting direction. Since there is produced a leak magnetic field between one head and another, a record on the tape 11 can be completely erased over the whole width of the tape 11 with all the erasing heads EA1-EAn operated.

Figure 6:
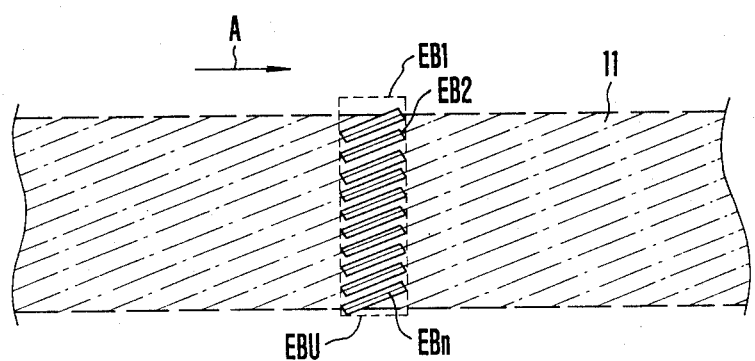
FIG. 6 shows erasing heads in a second embodiment of the invention.
Figure 7:
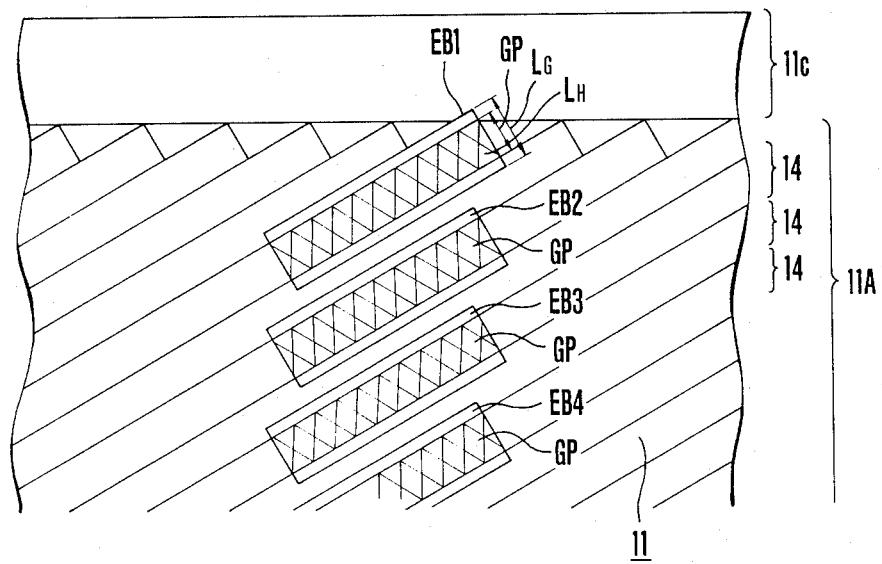
FIG. 7 is an enlarged view showing a part of FIG. 6.

Next, the erasing head 34 is arranged as a second embodiment, as shown in FIGS. 6 and 7. Referring now to FIG. 6, the erasing head 34 is indicated as an erasing head with EBU which comprises erasing heads EB1–EBn. These heads EB1-EBn are in the direction of the width of the tape 11 with the gap GP of each head EB extending parallel with the slant tracks 14 on the tape 11. The arrangement being such, the embodiment is capable of erasing the record parallel with the slant tracks 14 at the beginning and end of the flow of an erasing current. Each of the heads EB can be prepared to have its thickness LH (FIG. 7) measure 200 μm and the gap GP distance thereof measure 50-120 μm or thereabout in accordance with the bulk method, which is well known. Since the lowermost part of the gap GP of the head EB1 is above the uppermost part of the gap GP of the head EB2, the record in video track region 11A on the tape 11 can be completely erased over the whole width of the tape 11.

Figure 8:
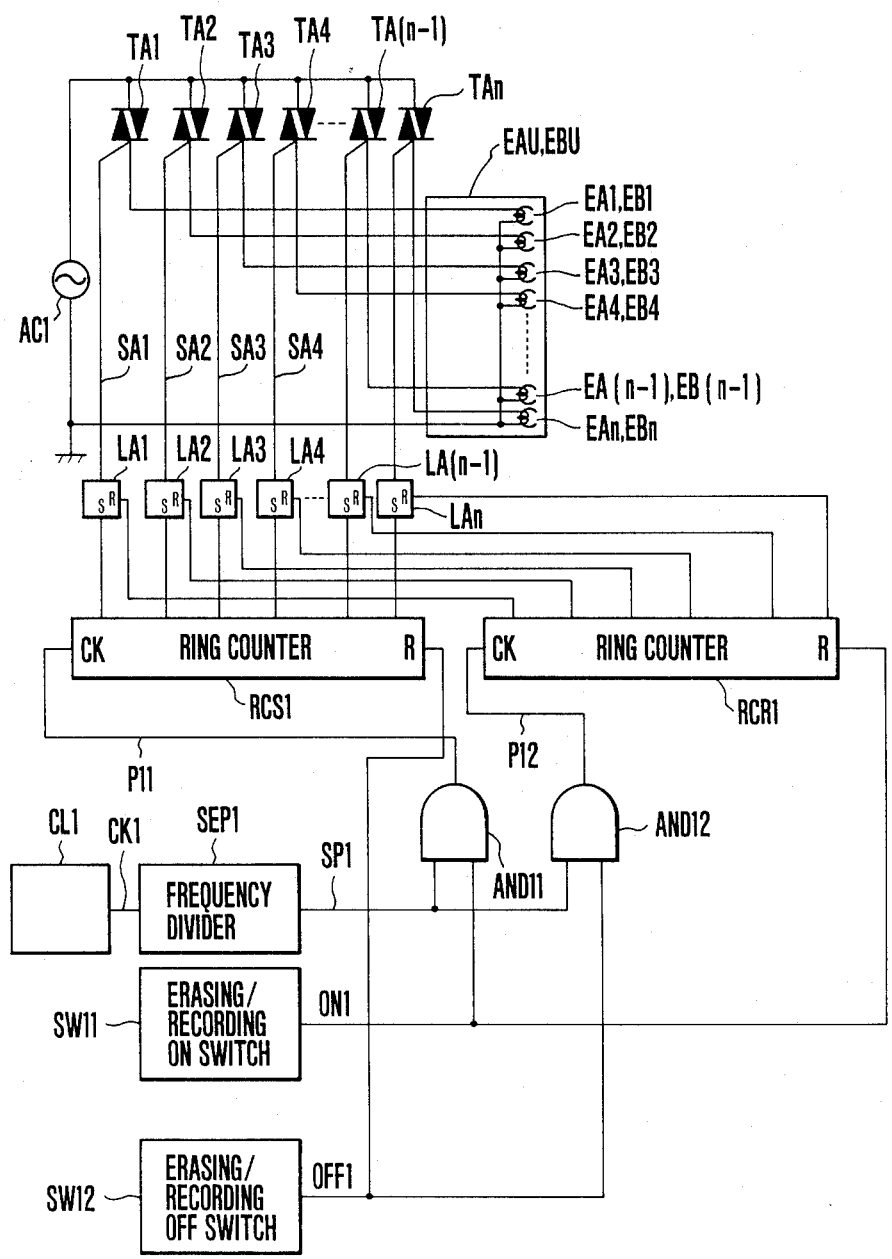
FIG. 8 is a circuit diagram showing a control circuit of the erasing heads of the second embodimemt.
Figure 9:
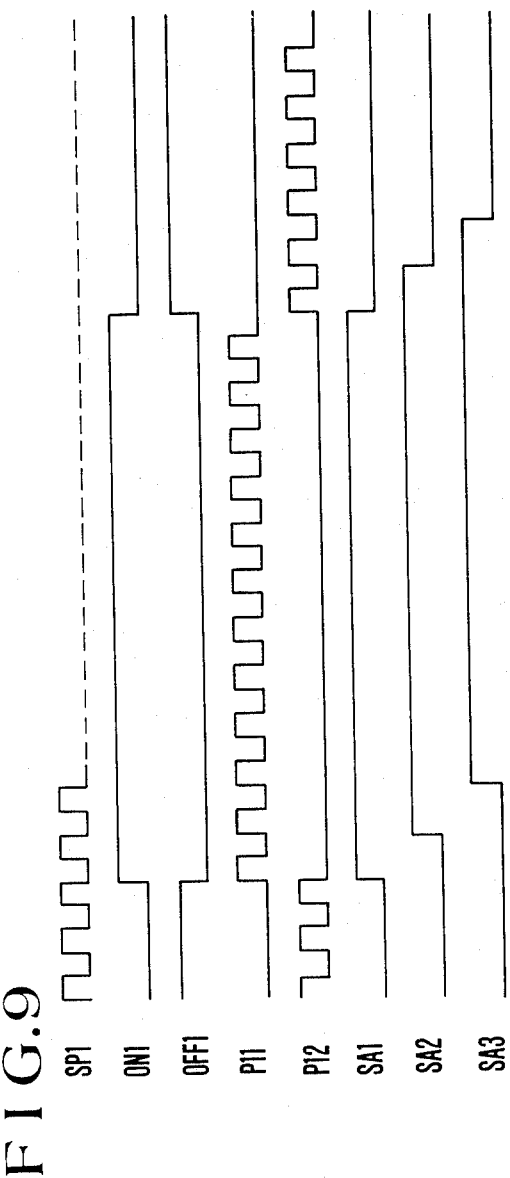
FIG. 9 is a timing chart showing the operation of the circuit shown in FIG. 8.

The control circuits of the first and second embodiments can be arranged in the same manner as shown in FIG. 8. Referring to FIGS. 8 and 9, the arrangement of the control circuit and the operation of the circuit are as described below:

The control circuit includes TRIACs TA1-TAn; an AC power source AC1 for erasing; latch circuits LA1–LAn; ring counters RCS1 and RCR1; a clock generator CL1; a frequency divider SEP1; a selecting switch SW11 for selection an erasing mode or a recording mode; a selection switch SW12 for turning off the erasing mode or the recording mode; and AND circuits AND 11 and AND 12. The control circuit operates as follows:

Clock pulses generated from the clock pulse generator CL1 are frequency divided at the frequency divider SEP1 and become a pulse signal SP1. The pulse signal SP1 is supplied to one of the input terminals of each of the AND circuits AND11 and AND12. When the selection switch SW11 is turned on, an input to the other input terminal of the AND circuit AND11 becomes high (hereinafter called "H"). This causes the pulse signal SP1 to be supplied to the ring counter RCS1. The ring counter RCS1 sets the latch circuits LA1, LA2, ... LAn one after another according to clock pulses P11 to make the output level of the latch circuits LA1-LAn "H", one after another. Accordingly, the TRIACs TA1, TA2, TA3, ... TA(n−1), TAn are turned on one after another impressing an erasing current from the power source AC1 on the erasing heads EA1, EA2, EA3, ... EA(n−1), EAn one after another.

When the switch SW12 for the erasing mode and the recording mode is turned off, the gate of the AND circuit AND12 opens causing the pulse signal SP1 which is produced from the frequency divider SEP1 to be supplied to the clock terminal of the ring counter RCR1. The switch SW12 output signal "H" is supplied as a reset signal to the reset terminal of the setting ring counter RCS1. The reset signal resets the ring counter RCS1. Therefore, the latch circuits LA1, LA2, ..., LAn are reset one after another in accordance with a pulse signal P12. As a result of this, the TRIACs TA1, TA2, ... TAn are turned off one after another to cut off the erasing current supply to the erasing heads EA1, EA2, ..., EAn one after another.

Figure 10:
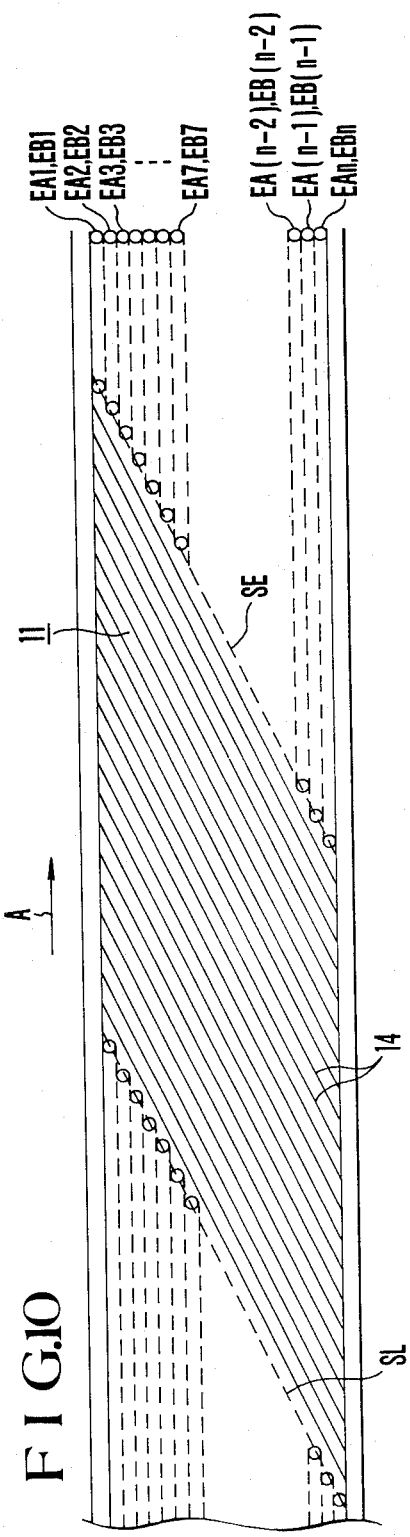
FIG. 10 is an illustration of an erasure on a magnetic tape.

Through the operation described above, an erasure terminating line SE and an erasure starting line SL can be set along the slant tracks 14, as shown in FIG. 10.

Figure 11:
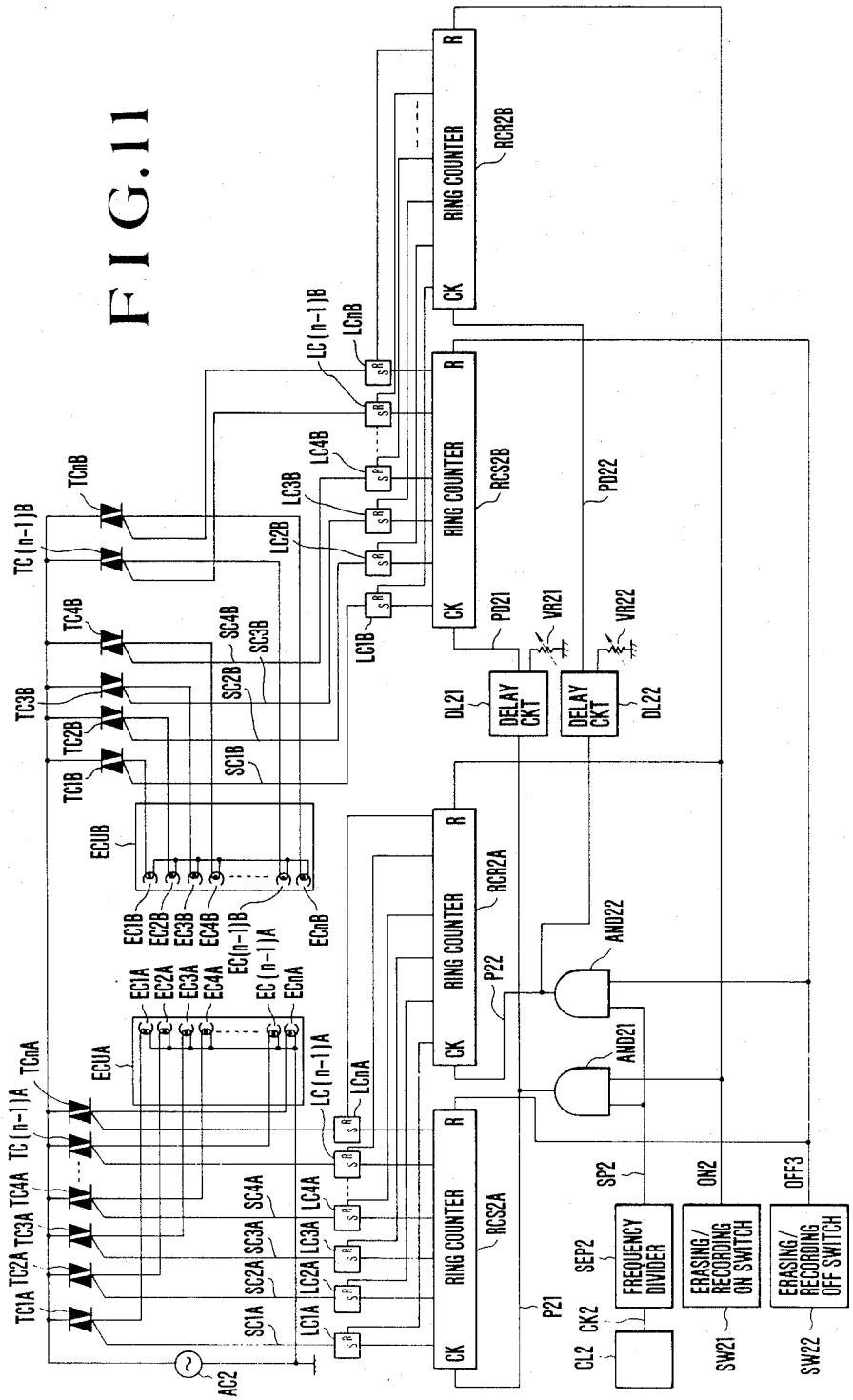
FIG. 11 is a circuit diagram showing an erasing head control circuit in a third embodiment of the invention.
Figure 12:
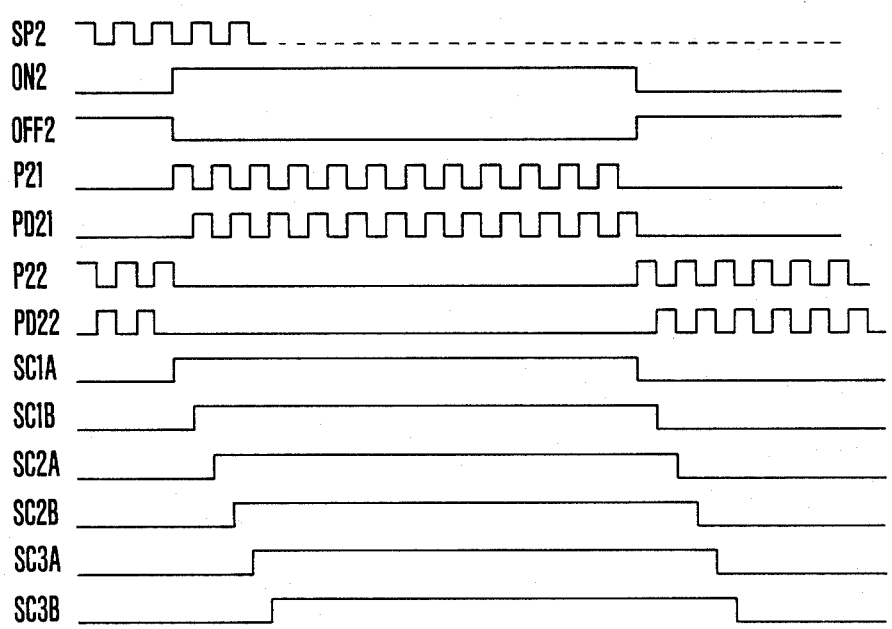
FIG. 12 is a timing chart showing the operation of the circuit shown in FIG. 11.

A third example of the erasing head 34 according to the invention is arranged and operates as shown in the circuit diagram of FIG. 11 and the timing chart of FIG. 12. The erasing head 34 in this embodiment is composed of two multiple erasing head units ECUA and ECUB. The unit ECUA consists of a plurality of erasing heads EC1A-ECnA while the other unit ECUB consists of a plurality of erasing heads EC1B-ECnB. The head EC1B is between the heads EC1A and EC2A and, likewise, all the heads are thus arranged in a zigzag manner. Each of the erasing heads 34 can be prepared to measure about 200 μm in length in the direction of the width of the tape and about 100 μm in the gap GP length in the direction of the width in accordance with the well known bulk method. With this heads 34 arranged in the zigzag manner, the whole width of the tape 11 can be completely covered by the erasing operation of all heads 34 of the two units ECUa, ECUB.

The circuit of the embodiment shown in FIG. 11 is arranged as follows:

The third embodiment includes TRIACs TC1A-TCnA and TC1B-TCnB; an AC power source AC2 for erasing; latch circuits LC1A-LCnA and LC1B-LCnB; ring counters RCS2A, RCR2A, RCS2B and RCR2B; a clock pulse generator CL2; a frequency divider SEP2; a selecting switch SW21 for selection an erasing mode or a recording mode; a selection switch SW22 for turning off the erasing mode or the recording mode; AND circuits AND21 and AND22; and delay circuits DL21 and DL22. This circuit operates as described below:

Clock pulses CK2 generated from the clock pulse generator CL2 is frequency divided at the frequency divider SEP2 to become a pulse signal SP2. The pulse signal SP2 is supplied to one of the input terminals of each of the AND circuits AND21 and AND22. When the selection switch SW21 is turned on, an input to the other input terminal of the AND circuit AND21 becomes high level (hereinafter called "H"). This causes the pulse signal SP2 to be supplied to the ring counter RCS2A and the delay circuit DL21. The output of the delay circuit DL21 is supplied to the ring counter RCS2B. The outputs of the ring counter RCS2A are supplied to the set terminals of the latch circuits LC1A, LC2A, ..., LCnA, one after another, according to input clock pulses P21. This causes the outputs of the latch circuits LC1A-LCnA to become "H". Meanwhile, in accordance with a clock pulse input PD1, the ring counter RCS2B turns the latch circuit LC1B, LC2B, ..., LCnB on one after another. Accordingly, the TRIACs TC1A, TC1B, TC2A, TC2B, TC3A, ..., TC(n−1)B, TCnA and TCnB are turned on impressing the erasing current from the power source AC2 to the erasing heads EC1A, EC1B, EC2A, EC2B, EC3A, ..., EC(n−1)B, ECnA, ECnB, one after another. In this embodiment, assuming that the erasing heads EC1A−ECnA and EC1B-ECnB in the erasing head units ECUA and ECUB are in the same position in the tape transporting direction, each of the heads EC1B-ECnB of the unic ECUB is turned on just in the middle of the time at which the adjoining heads EC1A-ECnA of the unit ECUA are turned on, as shown in FIG. 12. However, when the erasing heads EC1A-ECnA and EC1B-ECnB of the units ECUA and ECUB cannot be disposed in the same position in the tape transporting direction, or when their positions cannot be determined to a high degree of mechanical precision, the delay time can be adjusted through a variable resistor VR1.

When the erasing and recording mode switch SW22 is turned off, the gate of the AND circuit AND22 opens producing the pulse signal SP2 from the frequency divider SEP2 and it is supplied to the clock terminal of the resetting ring counter RCR2A and to the delay circuit DL22. The output signal "H" of the switch SW22 is supplied as a reset signal to the reset terminals of the setting ring counters RCS2A and RCS2B. This resets the ring counters RCS2A and RCS2B. Here, the delay time of the delay circuit DL22 is adjustable through a variable resistor VR22 in the same manner as the delay circuit DL21 mentioned in the foregoing. The output of the delay circuit DL22 is supplied to the resetting ring counter RCR2B. Then, in accordance with a pulse signal P22, the latch circuits LC1A, LC2A, ..., LCnA are reset one after another. Furthermore, in accordance with a pulse signal PD22, the latch circuits LC1B, LC2B, ..., LCnB are reset. As a result of this, the TRIACs TC1A, TC1B, TC2A, TC2B, ..., TCnA and TCnB are turned off in that sequence. Therefore, the erasing current supplied to the heads EC1A, EC1B, EC2A, EC2B, ... ECnA and ECnB is cut off, one after another, in that sequence.

With the embodiment arranged to operate in this manner, the erasure terminating line SE and the erasure starting line SL can be set along the slant tracks 14, as illustrated in FIG. 10. In this particular embodiment, two rows of erasing heads 34 are arranged in a zigzag manner. However, in accordance with this invention, the two rows of erasing heads 34 may be replaced with three of four rows. Furthermore, the erasing heads 34 in this embodiment are perpendicular to the tape transport or travelling direction. However, the arrangement of the heads 34 does not have to be exactly perpendicular but a certain degree of slanting relative to the travelling direction of the tape 11 is also allowable.

Figure 13:
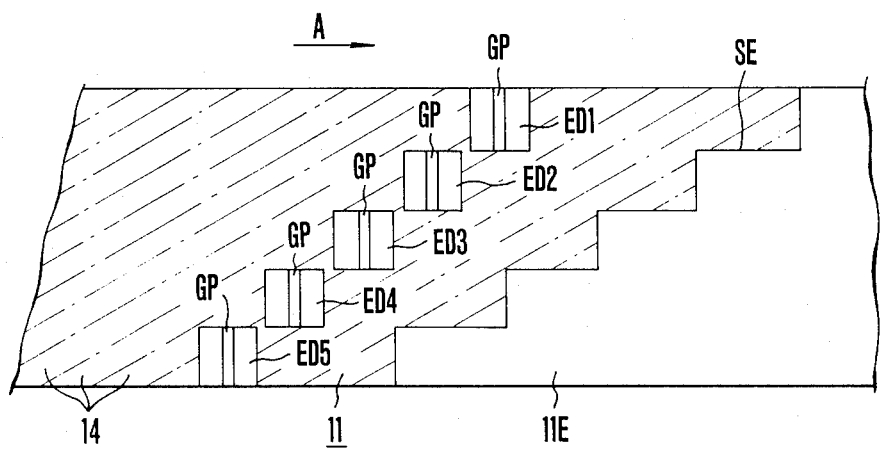
FIG. 13 is an illustration of erasing heads in a fourth embodiment of the invention.
Figure 14:
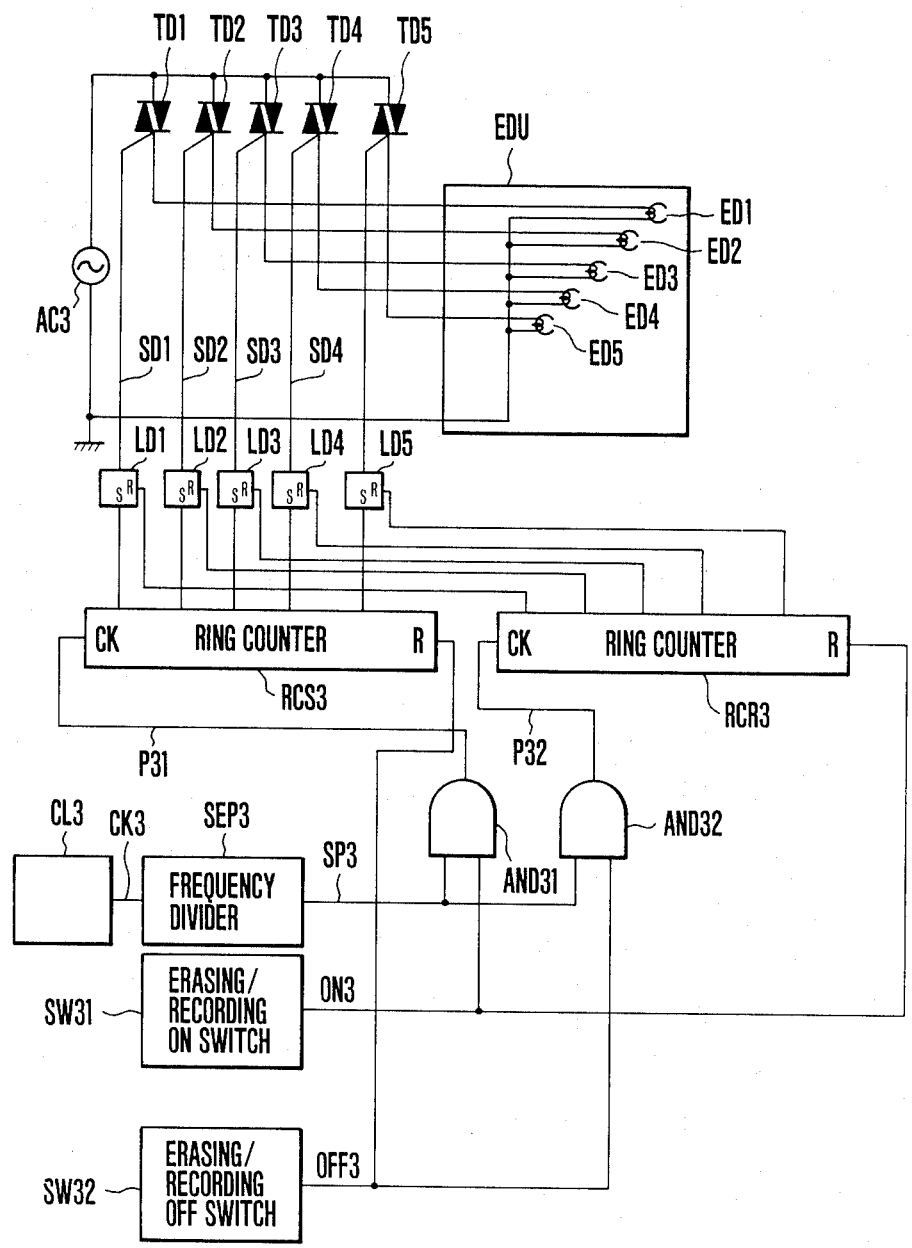
FIG. 14 is a circuit diagram showing the erasing head control circuit of the fourth embodiment.
Figure 15:
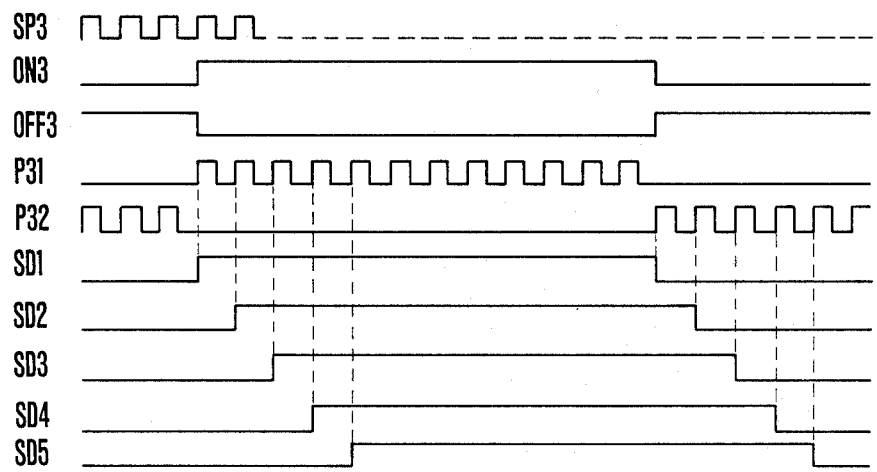
FIG. 15 is a timing chart showing the operation of each part shown in FIG. 14.

A fourth example of the erasing head 34, according to the invention, is arranged and operates as shown in FIG. 13, FIG. 14 which is a circuit diagram and FIG. 15 which is a timing chart. In the fourth embodiment, the erasing head 34 includes a plurality of erasing heads ED1-ED5.

The erasing heads ED1-ED5 are arranged in a row in different positions relative to the tape transporting direction (arrow A). The gap GP of each head ED1-ED5 extends perpendicular to the tape transporting direction. In the direction of the width of the tape 11, the positions of gaps GP of adjacent heads ED1-ED5 are overlapping to a slight extent to ensure complete erasure over the whole length of the tape width when all the heads ED1-ED5 are operated.

The circuit arrangement of the fourth embodiment is as follows: Referring now to FIG. 14, the circuit arrangement includes TRIACs TD1-TD5; an AC power source AC3 for erasing; latch circuits LD1-LD5; ring counters RCS3 and RCR3; a clock pulse generator CL3; a frequency divider SEP3; a selection switch SW31 for selection an erasing mode or a recording mode; a selection switch SW32 for turning off the erasing mode or the recording mode; and AND circuits AND31 and AND32. The operation of the circuit arrangement is as follows:

Clock pulses CK3 generated from the clock pulse generator CL3 are frequency divided at the frequency divider SEP3 to become a pulse signal SP3. The pulse signal SP3 is supplied to one of the input terminals of each of the AND circuits AND31 and AND32 respectively. When the selection switch SW31 is turned on, an input to the other input terminal of the AND circuit AND31 becomes high level (hereinafter called "H") causing the pulse signal SP3 to be supplied to the clock terminal of the ring counter RCS3. Then, in accordance with input clock pulses P31, the ring counter RCS3 sets the latch circuits LD1, LD2, ..., LD5, one after another, changing their outputs to "H", one after another. This in turn causes the TRIACs TD1, TD2, TD3, TD4 and TD5 to turn on, one after another. The erasing current from the power source AC3 is then impressed on the erasing heads ED1, ED2, ED3, ED4 and ED5, one after another.

When the switch SW32 for the erasing and recording modes is turned off, the gate of the AND circuit AND32 opens; and the pulse signal SP3 produced from the frequency divider SEP3 is supplied to the clock terminal of the resetting ring counter RCR3. The output signal "H" of the switch SW32 is supplied as a reset signal to the reset terminal of the setting ring counter RCS3 to reset the ring counter RCS3. Therefore, in accordance with a pulse signal P32, the latch circuits LD1, LD2, ..., LD5 are reset, one after another. As a result, the TRIACs TD1, TD2, ..., TD5 are turned off, one after another, to cut off the erasing current supply to the erasing heads ED1, ED2, ..., ED5, one after another.

With the operation performed in this manner, the erasure terminating line SE and the erasure starting line SL (not shown) can be set along the slant tracks 14 as shown in FIG. 13.

Figure 16:
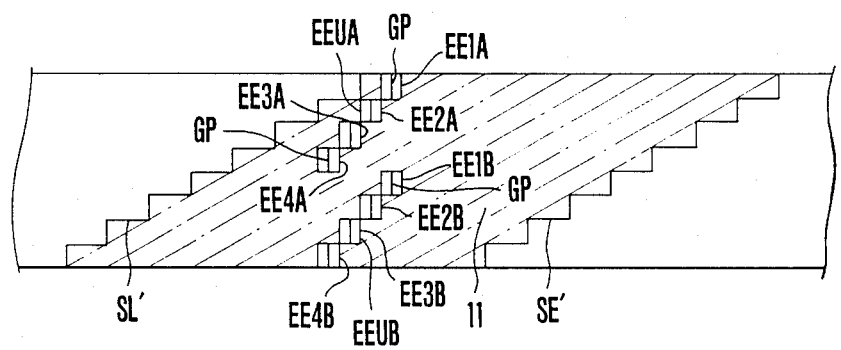
FIG. 16 is an illustration of the erasing heads in a fifth embodiment of the invention.
Figure 17:
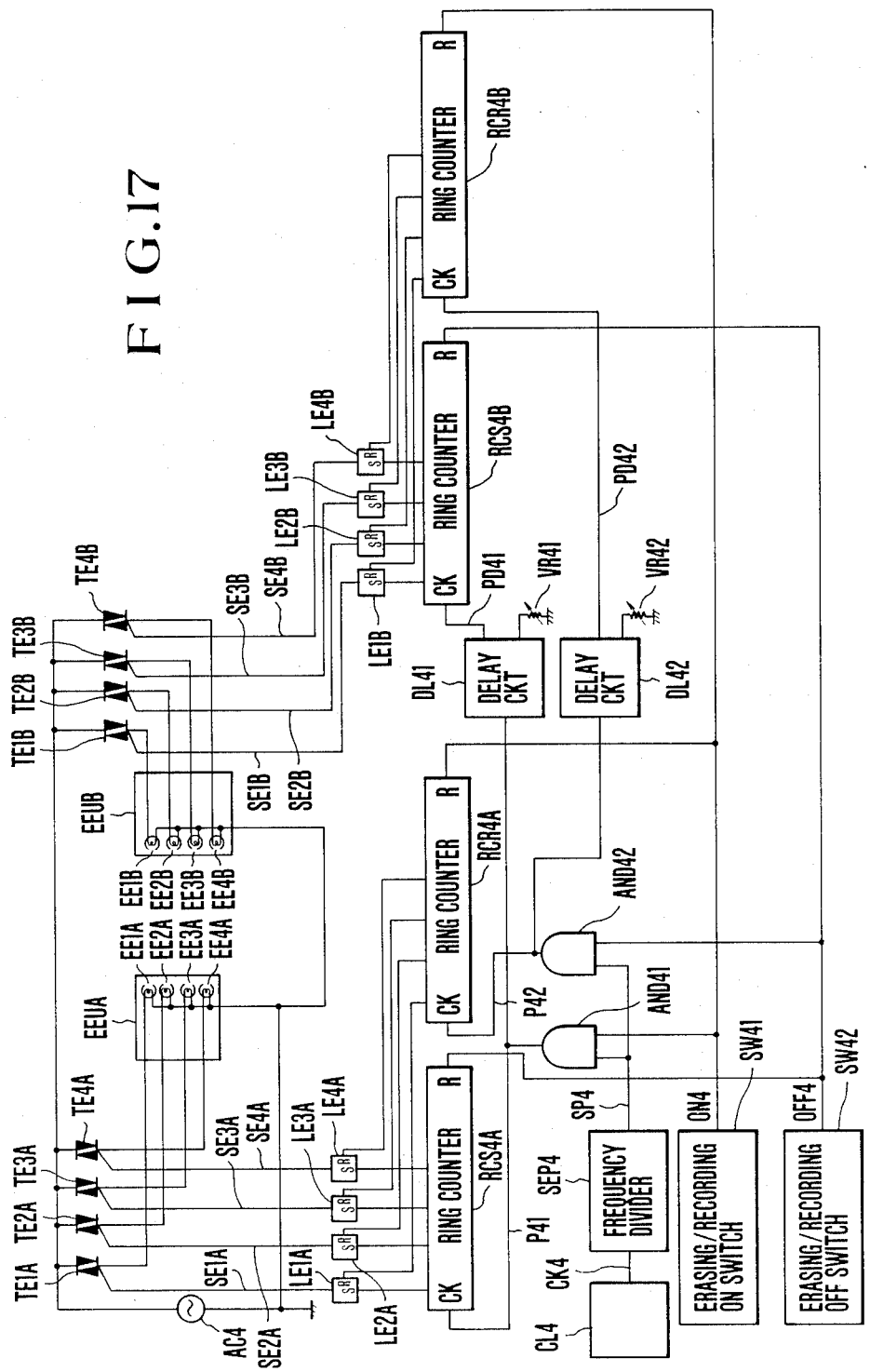
FIG. 17 is a circuit diagram showing the erasing head control circuit of the fifth embodiment.
Figure 18:
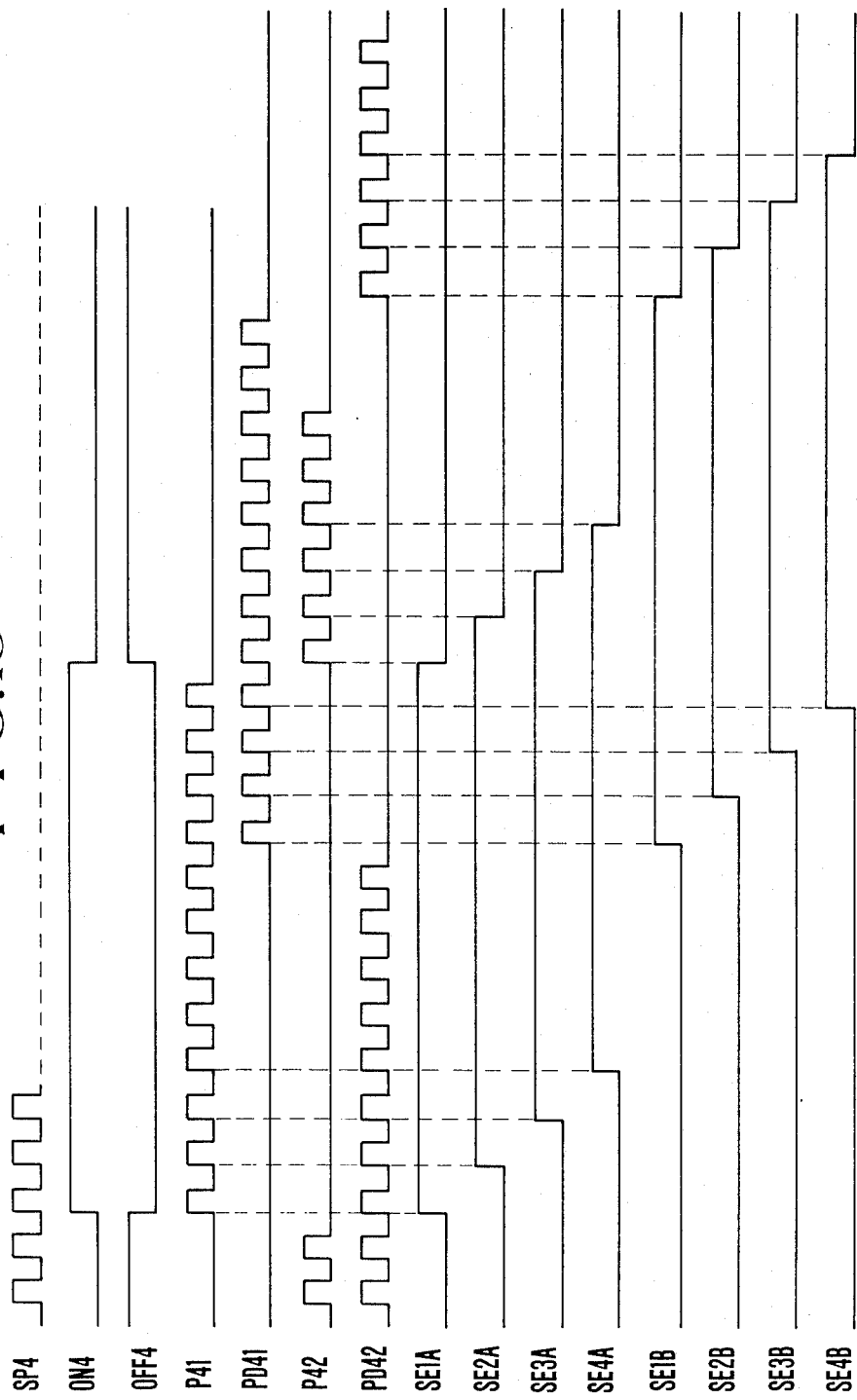
FIG. 18 is a timing chart showing the operation of each part shown in FIG. 17.

A fifth example of the erasing head 34 according to the invention is arranged and operates as shown in FIG. 16, FIG. 17 which is a circuit diagram and FIG. 18 which is a timing chart. Referring to these drawings, the erasing head 34 arrangement includes the two multiple erasing head units EEUA and EEUB. The unit EEUA includes erasing heads EE1A-EE4A while the other unit EEUB includes erasing heads EE1B-EE4B. The heads EE1A-EE4A and heads EE1B-EE4B are disposed in the same position relative to the tape transporting direction. The adjacent heads within each unit EEUA and EEUB and the heads EE4A and EE4B have their gaps GP overlapping respectively to a slight extent and thus provide a complete erasure over the whole width of the tape 11.

The circuit arrangement of the fifth embodiment, which is as shown in FIG. 17, includes TRIACs TE1A-TE4A and TE1B-TE4B; an AC power source AC4 for erasing; latch circuits LE1A-LE4A and LE1B-LE4B; ring counters RCS4A, RCR4A, RCS4B and RCR4B; a clock pulse generator CL4; a frequency divider SEP4; a selection switch SW41 for selection an erasing mode or a recording mode; another selection switch SW42 which is turns off the erasing mode or the recording mode; AND circuits AND41 and AND42; and delay circuits DL41 and DL42.

The operation of the circuit arrangement is as shown in FIG. 18. The clock pulse generator CL4 generates clock pulses CK4, which are frequency divided at the frequency divider SEP4 to obtain a pulse signal SP4.

The pulse signal SP4 is supplied to one of the input terminals of each of the AND circuits AND41 and AND42. When the selection switch SW41 turns on, an input to the other input terminal of the AND circuit AND41 becomes high level (hereinafter called "H"). This causes the pulse signal SP4 to be supplied to the ring counter RCS4A and the delay circuit DL41. Then, the output of the delay circuit DL41 is supplied to the ring counter RCS4B. In accordance with a clock pulse input P41 thereto, the ring counter RCS4A supplies a signal to the set terminals of the latch circuits LE1A, LE2A, ..., LE4A to cause the outputs of these latch circuits to become "H". Furthermore, in accordance with a clock pulse input PD41 thereto, the ring counter RCS4B turns on the latch circuits LE1B, LE2B, ..., LE4B. This causes the TRIACs TE1A, TE2A, TE3A and TE4A to turn on. Then, after the lapse of a certain period of time, the TRIACs TE1B, TE2B, TE3B and TE4B turn on, one after another. With the TRIACs turned on in this manner, an erasing current from the power source AC4 is impressed on the erasing heads EE1A, EE2A, EE3A, EE4A, EE1B, EE2B, EE3B and EE4B. In this embodiment, the number of the erasing head units is two. However, use of a greater number of erasing head units is more advantageous for reduction in size of the apparatus because each head EE1A-EE4A, EE1B-EE4B then comes to occupy a shorter distance in the tape transporting direction. Meanwhile, in cases where the position of these erasing head units EEUA and EEUB cannot be determined to a high degree of mechanical precision, the delay time required may be adjusted by means of a variable resistor VR41.

When the switch SW42 for the erasing mode and the recording mode is turned off, the gate of the AND circuit AND42 opens to have the pulse signal SP4, which is produced from the frequency divider SEP4, supplied to the clock terminal of the resetting ring counter RCR4A and to the delay circuit DL42. An output signal "H" produced from the switch SW42 is supplied as a reset signal to the reset terminals of the setting ring counters RCS4A and RCS4B to reset these ring counters RCS4A and RCS4B. The delay time of the delay circuit DL42 is adjustable by means of a variable resistor VR42 in the same manner as with the delay circuit DL41. The output of the delay circuit DL42 is supplied to the resetting ring counter RCR4B. Therefore, in accordance with the pulse signal P42, the latch circuits LE1A, LE2A, LE3A and LE4A are reset, one after another. Meanwhile, in accordance with the pulse signal PD42, the latch circuits LE1B, LE2B, LE3B and LE4B are reset, one after another. As a result, the TRIACs TE1A, TE2A, TE3A and TE4A are turned off. Then, after the lapse of a certain period of time, the TRIACs TE1B, TE2B, TE3B and TE4B are also turned off. Accordingly, the erasing current supplied to the heads EE1A, EE2A, EE3A, EE4A, EE1B, EE2B, EE3B and EE4B is cut off, one after another.

With the operation performed as described above, an erasure terminating line SE' and an erasure starting line SL' can be set along the slant tracks 14, as shown in FIG. 16.

In this embodiment, as described in the foregoing, the erasing heads EE1A-EE4A and EE1B-EE4B are turned on or off one after another according to their positions in the tape transporting direction.

In the first through fifth embodiments described in the foregoing, the erasure starting line SL and the erasure terminating line SE can be set approximately along the slant tracks 14 in a simple arrangement without having recourse to a complicated structural arrangement such as moving the erasing head 34 or to array erasing heads 34 along the slant tracks 14. Furthermore, an AC power source is employed as an erasing current source. However, the AC power source may be replaced with a DC power source.

As for the number N of the erasing heads 34 employed, the invention is based on the following concept: Assuming that, when a single piece of the erasing head 34 is used as in the conventional arrangement, the number of slant tracks intersecting the erasure starting SL or terminating line SE is M and that the length of time required for scanning this M number of tracks by a recording/reproducing head is T, there appear noises on the picture for the length of time T. Whereas, where the number of the erasing heads 34 is two and the second erasing head 34 is turned on after the lapse of time T/2 after the first one is turned on, the number of slant tracks 14 intersecting a stepwise erasing line becomes M/2. Accordingly, the length of time during which the noises appear on the picture can be reduced to T/2. In cases where an N number of erasing heads 34 are used, the erasing line likewise comes to intersect M/N number of slant tracks 14 and the noise occurring time then can be reduced to T/N. In other words, if M=N, such noises can be almost completely prevented from occurring. Such an arrangement is very advantageous for editing such as in connecting one picture to another. Therefore, the larger the number N of erasing heads 34, the shorter the noise occurring time will be. However, when the number N is more than two, a sufficiently great effect can be obtained.

Figure 19:
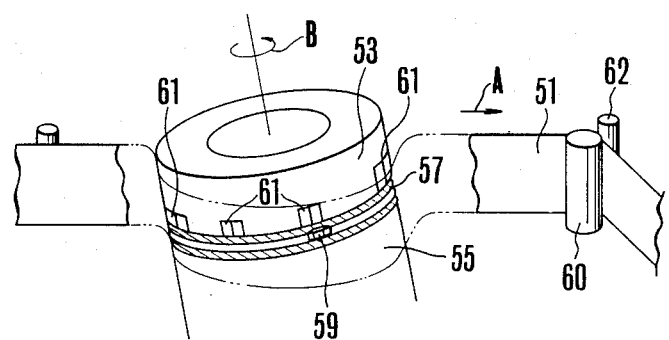
FIG. 19 is a schematic illustration showing erasing heads on a drum surface in a first embodiment of this type.

In the examples given in the foregoing, the erasing heads 34 are arranged in positions other than the position of a drum on the path of the tape. However, the present invention is not limited to such an arrangement. Other embodiments where the erasing heads 34 are disposed on the surface of the drum are as described below:

A first example of arranging erasing heads 34 on the surface of a drum in accordance with the invention is as shown in FIG. 19, wherein a reference numeral 51 identifies a magnetic tape; reference numeral 53 identifies a stationary upper drum with which magnetic tape 51 is to be brought into contact; a stationary lower drum 55 is arranged in the same manner as the upper drum 53; a rotating middle drum 57 has a video recording/reproducing head 59; reference numeral 60 identifies a pinch roller; reference numeral 61 identifies erasing heads; and reference numeral 62 identifies a capstan roller.

Figure 20:
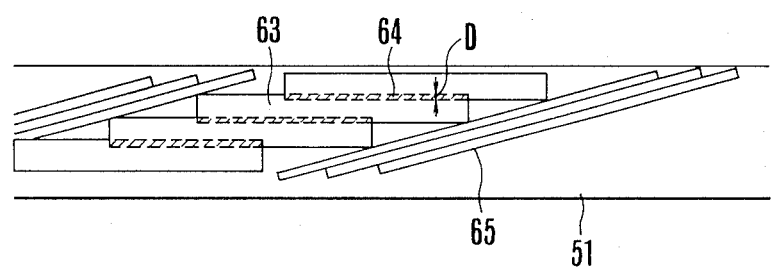
FIG. 20 is a schematic illustration showing a video record and erasing tracks on a magnetic tape 51.

In FIG. 20 which shows an erasing pattern of the embodiment shown in FIG. 19, reference numerals 63 and 65 respectively identify an erasing part and a video pattern. Referring to FIG. 19, the tape 51 travels in the direction of the arrow A jointly by the pinch roller 60 and the capstan roller 62. Meanwhile, the middle drum 57 rotates counterclockwise (or in the direction of arrow B). When a current flows simultaneously to all the erasing heads 61, they begin to erase at the same slanting angle as the longitudinal direction of the recording tracks 65 of the video head 59. These erasing heads 61 have their gaps overlap each other. More specifically, they overlap as much as the width of extent D in the direction of width of the tape 51, as shown by the broken line part in FIG. 5, to ensure a complete erasion coverage. When the supply of the erasing current is cut off for every erasing head 61, their erasing action comes to an end at the same slanting angle as the recording tracks 65 of the video head 61. In the case of FIG. 20, a total of four erasing heads 61 are used. For the use of a plurality of erasing heads 61, the embodiment is based on the following concept: Assuming that, when a single piece of erasing head 61 is used as in the conventional arrangement, the number of recording tracks 65 intersecting the erasure starting SL or terminating line SE is M and that the length of time required for scanning this M number of tracks 65 by the video head 59 is T, there appear noises on the picture for the length of time T. Meanwhile, where the number of the erasing heads 61 is two and the second erasing head 61 is be turned on after the lapse of a length of time T/2 after the first one is turned on, the number of the tracks 65 intersecting a stepwise erasing line resulting from the two head 61 arrangement becomes M/2. Then, the length of time during which the noises appear on the picture can be reduced to T/2. Likewise, where an N number of erasing heads 61 are used, the erasing line comes to intersect an M/N number of tracks 65 and the noise occurring time then can be reduced to T/N. Such noises thus would be almost completely obliterated if M=N.

Figure 21:
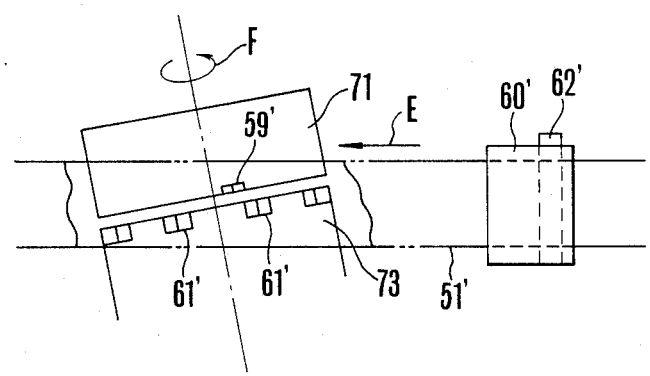
FIG. 21 is a schematic illustration showing erasing heads on a drum surface in a second embodiment of that type.

While a middle drum 57 rotating arrangement is adopted in the embodiment described above, another arrangement where the upper drum 53, instead of the middle one 57, is arranged to be rotative with a video head 59 mounted thereon is adopted in a second embodiment of the type having the erasing head 61 mounted on a drum as shown in FIG. 21. In FIG. 21, parts having the same functions as those shown in FIG. 19 are indicated by the same but apostrophized reference numerals. A reference numeral 71 identifies a rotary upper drum, while reference numeral 73 identifies a stationary lower drum. Assuming that the drum is rotating in the direction of an arrow F and the tape 51' in the direction of an arrow E, a plurality of erasing heads 61' are mounted on the lower drum 73. The surface having the plurality of erasing heads 61' is parallel to a video head 59' rotating surface. The gaps GP of the erasing heads 61' overlap each other to obtain the same effect as in the case of the first embodiment of this type.

Figure 22:
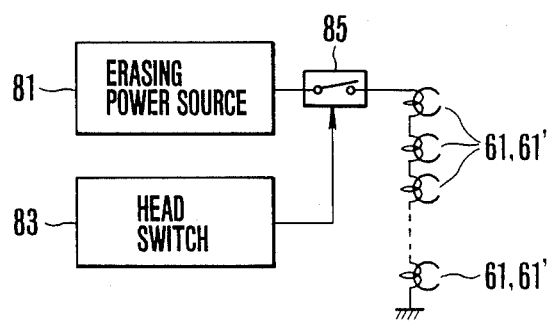
FIG. 22 is a circuit diagram showing the electric circuit of the first and second embodiments of the drum surface.

The electrical circuit arrangement is used for the first and second embodiments of the type having the erasing head 61' mounted on a drum is as shown in FIG. 22, wherein a reference numeral 81 identifies an erasing power source which can be either AC or DC. The circuit arrangement includes a head switch circuit 83 which produces a signal when a recording switch or an erasing switch 85 is turned on. When the recording or erasing switch 85 is turned on, the switch circuit 83 produces the signal to close the switch 85. With the switch 85 closed, an erasing current from the erasing power source 81 flows to the plurality of erasing heads 61 or 61' to begin erasing.

With the plurality of erasing heads 61' arranged on the drum on a plane which is parallel to the rotating plane of the video head 59' and with the gaps of these erasing heads 61' overlapping each other to a slight extent, the records on the tape 51' can be erased at the same slanting angle as the video tracks 65'. Turning on and off of the erasing current can be done simultaneously for every erasing head 61'. This permits simplification of the circuit arrangement.

Figure 23:
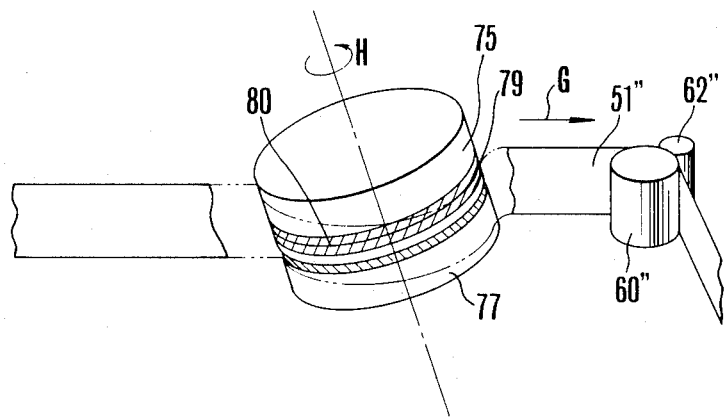
FIG. 23 is a schematic illustration showing a third embodiment of a drum surface erasing head arrangement according to the invention.

A third embodiment of the invention of this type is as shown in FIG. 23. In FIG. 23, the parts performing the same functions as those shown in FIG. 19 are indicated by the same numerals with a mark " affixed thereto. The embodiment includes a stationary upper drum 75; a stationary lower drum 77; and an erasing head 79 which is disposed on a peripheral surface perpendicular to the axis of the stationary upper drum 75. The erasing head 79 has a gap 80. The tape 51" is transported in the direction of an arrow G. A rotating video head (which is not shown) is between the upper and lower drums 75 and 77 and rotates in the direction of an arrow H. The embodiment is arranged such that, immediately before recording by the video head on the tape 51", the tracks of a previous record can be erased almost or completely in parallel with the recording track 65" of the video head. The electric circuit of the third embodiment is obtainable by replacing the erasing heads 61, 61' shown in FIG. 22 with one erasing head 79.

In this particular embodiment, an erasing head 79 which erases the slant record tracks 65" of the recording medium is thus provided on the surface of a guide body which contains therein a rotary recording head. Therefore, the erasing action of the erasing head 79 can be accomplished at the same slanting angle as the record tracks 65". This arrangement facilitates editing work on the tape 51" such as joining information or inserting new information into a record on the recording medium. Furthermore, the no signal, blank parts or overlapped parts that tend to be produced at the information joining part, as mentioned in the foregoing, can be greatly eliminated.

Figure 24:
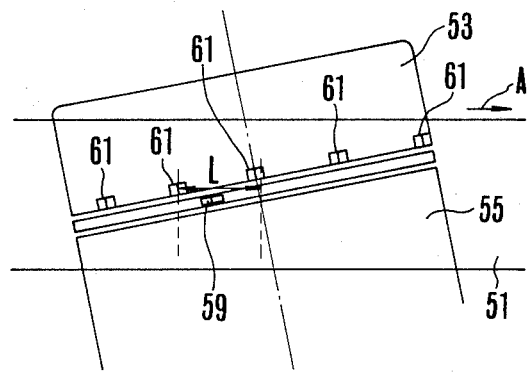
FIG. 24 is a side view of FIG. 19.
Figure 25:
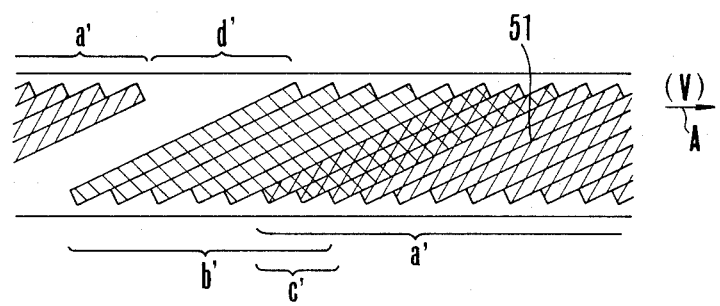
FIG. 25 is a schematic illustration of a record pattern on a tape being edited.

With the three embodiments as described in the foregoing, editing can be accomplished as follows: FIG. 24 is a side view of the oblique view of FIG. 19. FIG. 24 shows a distance L between the erasing position of the erasing head 61 and the recording track 65 of the video head 59 in the tape transporting direction. FIG. 25 shows a recording pattern obtained when editing (insert) is accomplished by simultaneously bringing the video head 59 and the erasing heads 61 into their operating states and, thereafter, by simultaneously bringing them into non-operating states using the above-mentioned drum arrangement. Referring to FIG. 25, a reference symbol a' identifies a recorded part existing before insertion and b' identifies an inserted part. This insertion then results in an overlapping part c' and a no-record part d' which arise to an extent proportional to the above stated distance L. At the beginning of the insertion, there appears the overlapping part c' which results in an overlapping noise on a TV picture. At the end of the insertion, there appears the no-record part d' which results in a no-record noise on a TV picture. Assuming that the distance between the erasing head 61 and the recording track 65 in the tape transporting direction is L and that the velocity at which the tape 51 is transported is V, there arises a time lag of as much as L/V. At the beginning of the insertion, the picture deteriorates for a length of time L/V. Then, the picture disappears for the length of time L/V at the end of the insertion. The disappearance and the overlapping deterioration of the picture can be prevented by a control circuit arranged as shown in FIG. 26.

Figure 27:
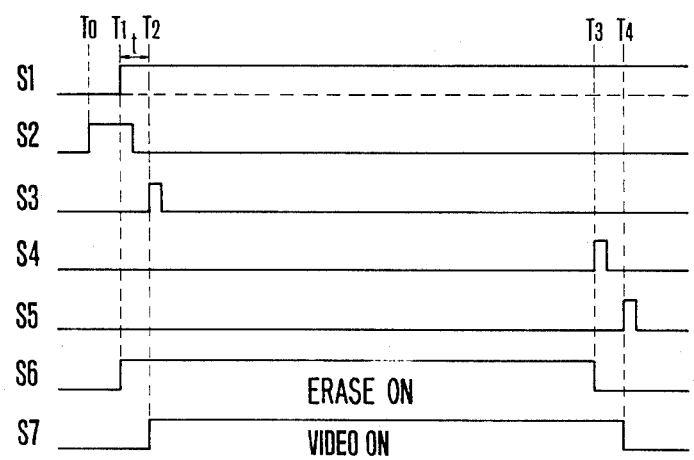
FIG. 27 is a timing chart showing the operation of each part of the circuit arrangement shown in FIG. 26.

Referring now to FIG. 26, the control circuit arrangement includes an input terminal P1 provided for a video signal VI; a video signal processing circuit VPC which performs low zone conversion, frequency modulation, etc.; a recording amplifier AMP; a switch SW1 and another switch SW2 which are provided for switch-over between video heads VH1 and VH2; an input terminal P2 which is for a signal F/R representative of the normal or reverse rotation of a capstan roller 62; an input terminal P3 for a pulse signal FG from the capstan roller 62; a pulse rectification circuit PRC; an input terminal P4 provided for a signal PI which becomes a high level (hereinafter will be called "H") when the pinch roller 60 comes to abut upon the capstan roller 62; an up-down counter UDC; an input terminal P5 for a signal SPD which designates the start position of insertion; an input terminal P6 for a signal EPD which designates the end position of the insertion; gate circuits GT1 and GT2; a start count register SCR which stores the value of the counter UDC representing the start position of the insertion; an end count register ECR which stores the value of the counter UDC representing the end position of the insertion; a preset value storage circuit PSR which stores the count value of the counter UDC corresponding to the above stated distance L; an addition circuit PLS; a subtraction circuit MNS; an input terminal P7 for a signal MOD from an insert mode switch (not shown), the terminal becoming "H" at the time of the insert mode; an input terminal P8 for a signal REC from a recording key, the input terminal P8 becoming "H" at the time of recording; an input terminal P9 for a signal STP from a stop key, the terminal P9 becoming "H" at the time of stopping; an input terminal P10 for a signal ERC from an erase key, the terminal P10 becoming "H" at the time of erasing; an erasing power source EPS; a switch SW3; erasing heads EH; magnitude comparators COM1-COM4; set-reset flip-flops FF1-FF4; an AND circuit AND; an OR circuit OR; and an inverter INV. The operation of this circuit arrangement will be described below with reference to FIG. 27 which is a timing chart:

Under a normal recording mode, the signal MOD is at a low level (hereinafter will be called "L"). Therefore, when the level of the recording signal REC becomes "H", the flip-flops FF3 and FF4 are set. The switches SW1 and SW3 are then concurrently closed. A recording signal is impressed on the video head VH. Then, an erasing current flows to the erasing heads EH. The flip-flops FF3 and FF4 are reset and the switches SW1 and SW3 open. When the erasure signal ERC becomes "H", the switch SW3 alone closes rendering the erasing heads EH operative.

In the inserting mode, when the operator turns the mode switch on, the signal MOD becomes "H". Under this condition, the operator designates an insert start position and an insert end position while watching the picture on a monitor TV set. Then, the signal PI which is representative of the abutting engagement of the pinch roller 60 and the capstan roller 62 and the pulse signal FG are "and" processed and supplied to the up-down counter UDC. The up-down counter UDC serves as an additional counter when the capstan roller 62 is making a normal rotation (at the time of normal recording or reproduction) and as a subtraction counter at the time of a reverse rotation of the capstan roller 62 (during tape 51 rewinding). Therefore, the position of the tape 51 in the tape transporting direction is accurately reflected.

When the insert start position designating signal SPD is supplied, the count value of the counter UDC obtained at that time is stored at the register SCR. Furthermore, when the insert end position designating signal EPD is supplied, the count value which is then obtained at the counter UDC is stored at the register ECR. When a rewind key (not shown) is depressed by the operator after completion of designation, the tape 51 returns to the insert start position and stops. This point of time is indicated as T0 in FIG. 27. At this point of time T0, the count value of the counter UDC coincides with the value of the register SCR. The output of the comparator COM1 becomes "H". Accordingly, the flip-flop FF2 is a set. When the operator depresses the record key at another point of time T1 where a video signal to be inserted is supplied to the terminal P1, the signal REC becomes "H" causing the output S1 of the AND circuit AND2 to become "H". Then, the output S6 of the AND circuit AND5 becomes "H" rendering the erasing heads 61 operative. Concurrently, the capstan roller 62 rotates in the normal rotating direction by a capstan control circuit, which is omitted in the drawing for the sake of simplification of the illustration.

With the capstan roller 62 thus rotated, the output of the addition circuit PLS and the count value of the counter UDC coincide with each other at a point of time T2 which is a length of time t after the point of time T1. Then, the output S3 of the comparator COM3 becomes "H". This renders the video head VH1 or VH2 operative. The output of the subtraction circuit MNS and the output value of the counter UDC coincide with each other at a point of time T3 which is a length of time t before a point of time T4 where the insert end position is to be reached. The output S4 of the comparator COM4 then becomes "H". This resets the flip-flop FF2 rendering the erasing heads 61 inoperative.

When the tape 51 reaches the insert end position, the output of the register ECR coincides with the value of the counter UDC and the output S5 of the comparator COM2 becomes "H". This resets the flip-flop circuit FF1 to render the video head VH inoperative. The inserting process comes to an end. A building-up time for tape travel after abutting engagement of the capstan roller 62 and the pinch roller 60 in the travelling path of the tape 51 is almost negligible. Therefore, the time t corresponds to L/V. Besides, since the number of FG pulses corresponds to the tape conveying distance, the presetting value of the circuit PSR can be obtained from L.

Figure 28:
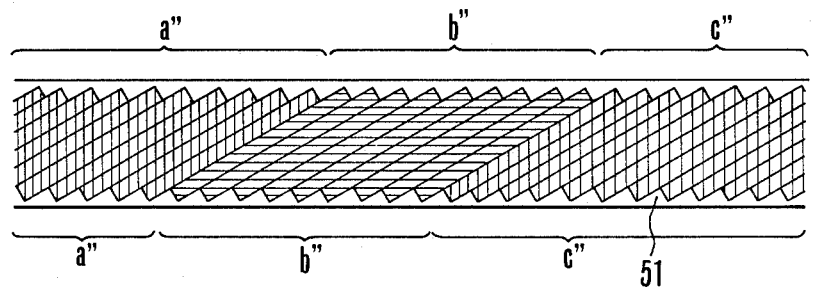
FIG. 28 is an illustration of a record pattern on a tape being edited.

Referring to FIG. 28, since the embodiment operates in the manner described above, it permits editing work without overlapping the existing record portion a" and the inserted portion b" and without leaving any no-signal or blank portion. While the above description has covered the operation of the first embodiment of the type having erasing heads 61 arranged on a drum surface, the description also applies to the second and third embodiments of that type in the same manner. Furthermore, in these specific embodiments, the control is accomplished with the FG pulses from the capstan roller 62. However, this arrangement may be replaced with the use of some other suitable means such as a timer or a reel counter which counts the number of revolutions of a reel.

Since the erasing means is rendered operative before the recording means at the start of recording in the embodiments described above, the overlapping information part can be obliterated or at least lessened. Furthermore, since the erasing means is rendered inoperative before the recording means is rendered inoperative at the end of recording, the non-recorded part can be obliterated or at least lessened.

Figure 29:
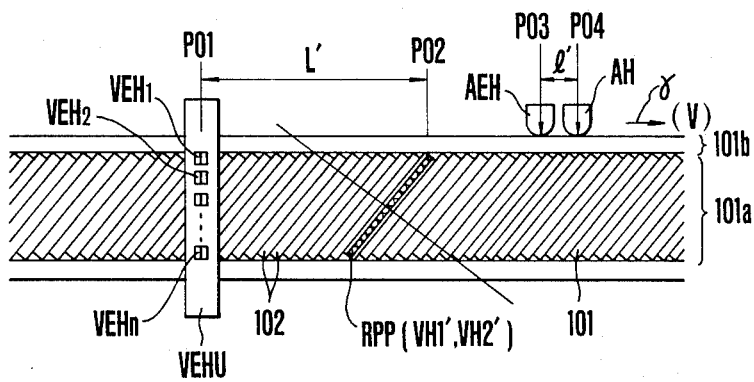
FIG. 29 is an illustration showing erasure of video and voice signals and the position of a recording head.
Figure 30:
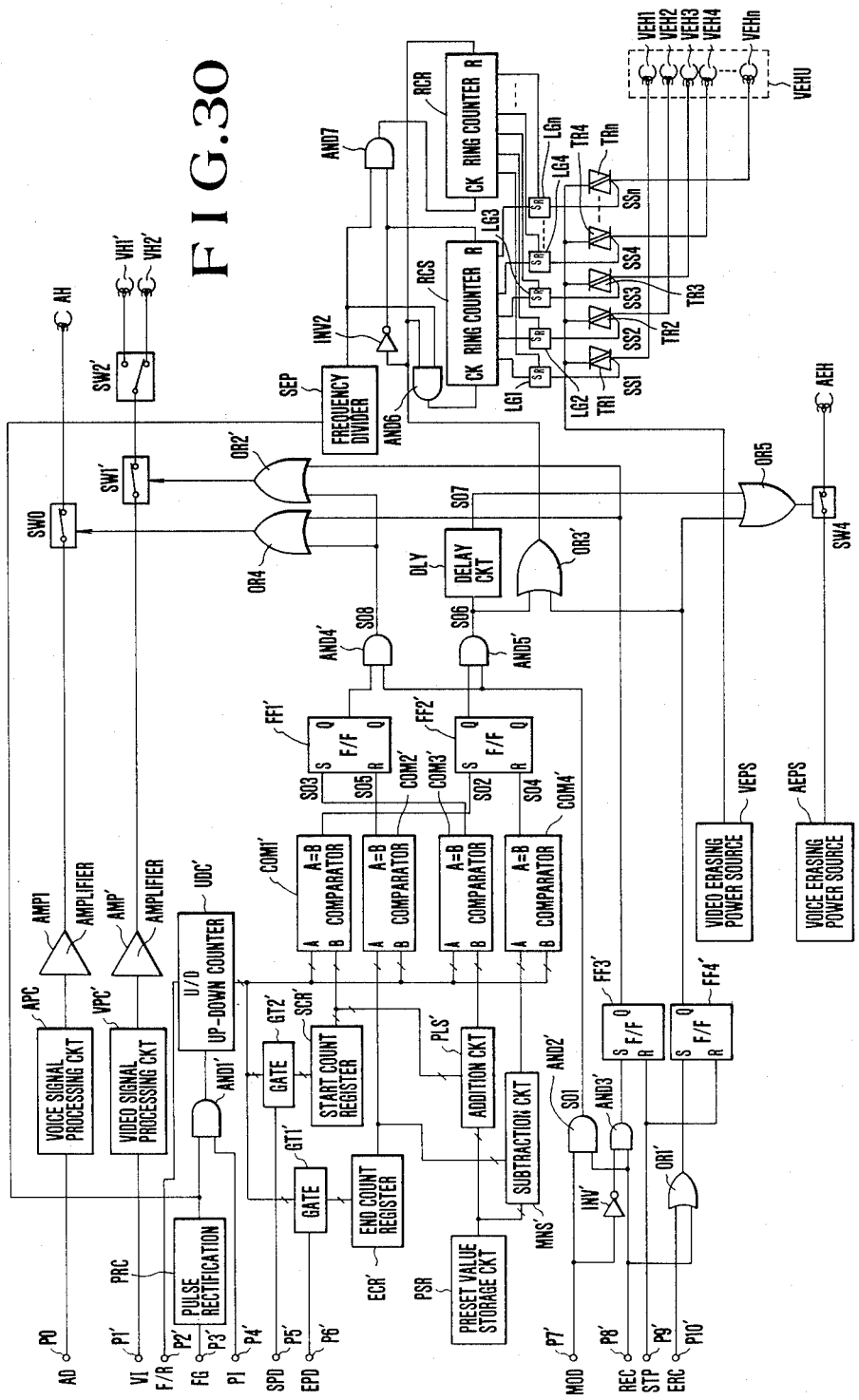
FIG. 30 is a circuit diagram showing a control circuit for simultaneous editing of video and voice signals.

Next, an embodiment of the invention wherein both video information and audio information can be edited is shown in FIGS. 29 and 30. FIG. 29 shows the relative position of a video information erasing head, a video information recording head, a voice information erasing head and a voice information recording head employed in a VTR. In FIG. 29, a reference numeral 101 indicates magnetic recording tracks; 101a indicates a video recording zone; 101b indicates a voice recording zone; and 102 indicates video recording tracks. The VTR includes a multiple erasing head unit VEHU consisting of video information erasing heads VEH1, VEH2, ... and VEHn; a voice information erasing head AEH; and a voice information recording head AH. A reference symbol P01 indicates a video erasing position; reference characters P02 identify a video recordig position; reference characters P03 identify a voice erasing position; reference characters P04 identify a voice recording position; reference character L' identifies a distance between the positions P01 and P02; and reference character l' indicates a distance between the positions P03 and P04. The distance L' differs from the distance l'.

In this embodiment, an erasing process begins at the same slanting angle as the recording tracks 102 of the video recording head by switching on the stationary erasing heads VEH1–VEHn one after another and the erasing process is ended at the same slanting angle as the above stated tracks by switching off the erasing heads VEH1–VEHn one after another. This arrangement of the embodiment permits high quality editing.

Figure 31:
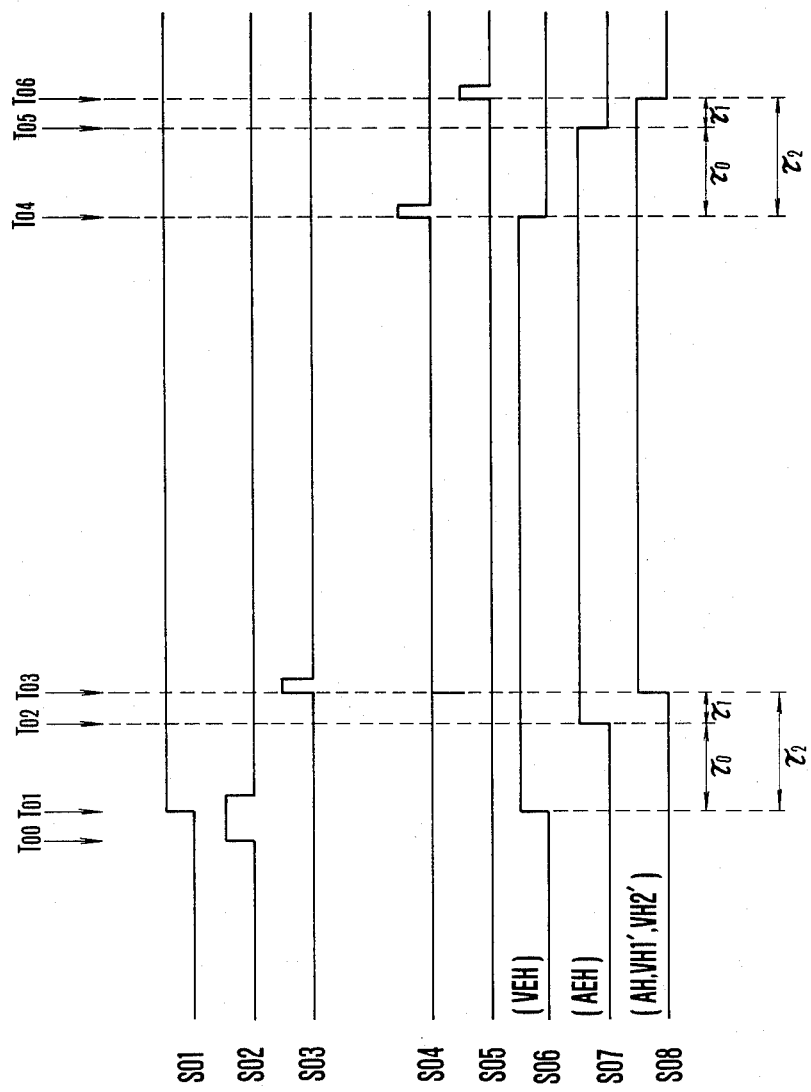
FIG. 31 is a timing chart showing the operation of each part of the circuit arrangement shown in FIG. 30.

A control circuit arrangement according to the invention which permits editing of both voice information and video information without any overlapped part and without leaving any no-signal part is shown in FIG. 30. The operation of each part of the circuit arrangement of FIG. 30 is shown in FIG. 31, which is a timing chart.

In FIG. 30, the parts performing the same functions as those shown in FIG. 26 are indicated by the same reference symbols and numerals as in FIG. 26 except that they are apostrophized in FIG. 30. A reference symbol AD indicates a voice signal; reference characters identify a voice signal processing circuit; reference characters AMP1 identify a recording amplifier; reference characters SW0 and SW4 identify switches; reference characters DLY identify a delay circuit; reference characters VEPS identify a video erasing power source; reference characters AEPS identify a voice erasing power source; reference characters SEP identify the frequency divider for frequency dividing the signal FG; reference characters RCS identify a setting ring counter; reference characters RCR identify a resetting ring counter; reference characters LG1–LGn identify latch gates; and reference characters TR1–TRn identify TRIAC's. In the inserting mode, an insert start position and an insert end position are stored at a start count register SCR' and at an end count register ECR' in the same manner as in the embodiment shown in FIG. 26. When the tape 51' is brought back to the insert start position and the recording signal REC becomes high level ("H") at point of time Too as indicated in FIG. 31, an output signal S06 of an AND circuit AND5' becomes high level ("H"). This causes the video erasing heads VEH1–VEHn to turn on one after another, because: The signal S06 makes the level of one of the input terminals of the AND circuit AND6 high while the output of the frequency divider SEP is supplied to the other input terminal. Therefore, the output of the frequency divider SEP causes the output terminals of the ring counter RCS to become "H", one after another, beginning with the leftmost output terminal. Accordingly, the latch gates LG1-LGn are set to turn on the TRIAC's TR1-TRn, one after another. Therefore, an erasing current flows from the video erasing power source VEPS to the video erasing heads VEH1-VEHn, one after another, beginning the erasing process along the video recording tracks 102'.

The signal S06 is delayed at the delay circuit DLY by a length of time τ0 to give a signal S077 at a point of time T02. The signal S07 causes the switch SW4 to close. This in turn causes an erasing current to flow from the voice erasing power source AEPS to the voice erasing head AEH and a voice erasing process begins. The time τ0 corresponds to (L'-l')/V, wherein V represents a tape transporting velocity.

The flip-flop FF1' is set at a time T03 and the output signal S08 of the AND circuit AND4' becomes "H". Then, this causes the switch SW1' to close through the OR gate OR2'. The video signal VI is impressed on the video head VH1' or VH2' and video recording begins. At the same time, the switch SW0 is closed impressing the voice signal AD on the voice recording head and voice recording begins. An interval τ1 between the points of time T02 and T03 becomes l'/v while another interval τ2 between the points of time T01 and T03 becomes L'/v. In other words, voice erasing begins at a point of time when the tape 51' has travelled to an extent of L'-l' after commencement of video erasing. Then, both voice and video recording processes begin when the tape 51' travels a distance l' after that time.

The signal S06 becomes "L" at a time T04 before the tape 51' reaches the insert end position bringing the video erasing process to an end. With the signal S06 having become "L", the output of the frequency divider SEP coincides with the output of the AND circuit AND7. The clock pulse output of the frequency divider SEP then causes the output terminals of the resetting ring counter RCR to become "H", one after another, starting with the leftmost one. Accordingly, the latch gates LG1-LGn are reset, one after another, turning off the TRIAC's TR1-TRn, one after another. Therefore, the erasing current flowing from the video erasing power source, to the heads VEH1-VEHn is cut off, one head after another, in that order. Accordingly, the video erasing process comes to an end along the video recording tracks 102'.

After the lapse of a length of time τ0 after the time T04 the signal S07 becomes "L" at a time T05 causing the switch SW4 to open. Therefore, the voice erasing process also comes to an end. Then, the signal S08 becomes "L" at a time T06, which is a length of time τ2 after the time T04. With the signal S08 having become "L", both the voice and video recording processes come to an end. As described above, the voice erasing process come to an end when the tape 51' has travelled a distance of L'-l' after the video erasing process begins termination. Then, both the video and voice recording processes terminate when the tape 51'∝ travels a distance of l' thereafter.

The embodiment thus comprises a video recording means which records video information in a first position in the travelling path of the strip-like recording medium; a voice recording means which records voice information in a second position in the travelling path; a video erasing means which erases video information recorded on the medium in a third position which differs from the first position; and a voice erasing means erases voice information recorded on the medium in a fourth position which differs from the second position.

When a distance between the first and third positions differs from a distance between the second and fourth positions, the video information erasing means and the voice information erasing means are rendered operative or inoperative at various timings. This arrangement, according to the invention, effectively obliterates overlapped parts or no-record parts at joining parts for editing relative to both the video and voice recording tracks.

In this specific embodiment, the multiple erasing heads 61' are perpendicularly aligned relative to the longitudinal direction of the tape 51'. However, this can be replaced with a zigzag or an oblique arrangement.

The following is an example of editing voice records: FIG. 32 shows the arrangement of a tape 201 and heads including the tape 201, an erasing head 202 and a voice recording/reproducing head 203. FIG. 33 shows voice magnetizing resulting from editing carried out by the conventional method. In FIG. 33, a reference symbol a indicates existing recorded parts; b indicates an insert part inserted in the record; c indicates an overlapped part between the recorded part and the insert part; and d indicates a no-record part, which is left blank after editing.

FIG. 34 is a circuit diagram showing a control circuit used for editing. The circuit includes a voice input terminal 211; a recording amplifier 212; an oscillation circuit 214 for biasing and erasing; the recording/reproducing head 203; the erasing head 202; a power supply switch 213 for the recording/reproducing head 202; a switch 215 for the power supply to the erasing head 202; an editing switch 216; a change-over circuit for editing; and a delay circuit 218.

Referring to FIG. 32, the erasing head 202 and the recording/reproducing head 203 are normally arranged with a mechanical positional difference l between them. Therefore, when the recording/reproducing head 203 and the erasing head 202 are simultaneously switched on and off in carrying out an editing process, the overlapped part c is produced at the beginning of the editing process and the no-record or blank part d at the end of the editing process, as shown in FIG. 33. However, the parts c and d are in relation to the distance or the positional difference l. Therefore, assuming that the building-up of the tape 201 travel at the time of editing is sufficiently quick, there is attained a relation of c=d=l. Therefore, assuming that the travelling speed of the tape 201 is v, the above problem can be solved by adjusting the timing of the switching of the erasing head 202 and the recording/reproducing head 203 on and off by a length of time corresponding to l/v.

The voice signal to be used for editing is applied to the input terminal 211. The signal is amplified through the recoding amplifier 212 and is superimposed on a bias from the oscillation circuit 214. Meanwhile, a current is produced from the oscillation circuit 214 for erasing and biasing. When the editing start switch 216 is turned on, the output of the change-over switch 217 causes the switch 215 to close supplying power to the erasing head 202. A current flows to the erasing head 202 and erasing begins. Furthermore, the output of the change-over circuit 217 closes the switch 213 after a time lag corresponding to v/l. The recording/reproducing head 203 is thus switched on. Accordingly, the head 203 begins recording after a lapse of time corresponding to v/l after the commencement of erasing by the erasing head 202.

Upon completion of editing, the switch 216 is turned off. A completion signal is produced from the changeover circuit 217 indicating the end of editing. With the completion signal produced, the current flow to the erasing head 202 is cut off. Then, the completion signal is delayed by a length of time corresponding to v/l through the delay circuit 218 before it causes the recording current to the recording head 203 to be cut off. Therefore, this arrangement prevents the overlapping part c and the blank part b from occurring between the recorded part a and the insert part b at the beginning and the end of the editing process to ensure satisfactory editing. The editing switch 216 may be a recording starting and ending switch or may be replaced by the following arrangement: A cue signal or the like is recorded on the tape 201 to show an editing range thereon and switching is performed by detecting this signal. As described aboved, the embodiment ensures satisfactory results of voice editing.

With the information recording position and the information erasing position being arranged at different points in the travelling path of the recording medium, the recording means operates after the erasing means and becomes inoperative after the erasing means becomes inoperative. This arrangement, according to the invention, either obliterates or lessens the overlapped part c and the blank part d to permit editing work on voice and video records in a satisfactory manner.

The invention is not limited to the specific embodiments thereof described in the foregoing. It is to be understood that changes and various modifications may be made without departing from the spirit or scope of the following claims.

What we claim is:

1. An information signal recording apparatus, comprising:
    (a) recording means including at least one rotating head which traces a tape-shaped recording medium obliquely in the lengthwise direction of said medium for recording the information signal on said medium;
    (b) erasing means including n-pieces (wherein n is an integer of two or larger) of fixed erasing heads for tracing different positions in the direction of the width of said tape-shaped recording medium in the lengthwise direction of the same, wherein each of said fixed erasing heads includes a gap which extends obliquely to said medium and substantially matches the direction in which said rotating head traces said medium; and
    control means for individually controlling the erasing operations of said n-pieces of fixed heads.

2. An apparatus according to claim 1, wherein said n-pieces of fixed heads are arranged on a straight line in the direction of the width of said tape-shaped recording medium.

3. An information signal recording apparatus, comprising:
    (a) recording meand including at least one rotating head which traces a tape-shaped recording medium obliquely in the lengthwise direction of the same for recording the information signal on said medium;
    (b) erasing means including n-pieces (wherein n is an integer of 2 or larger) of fixed erasing heads tracing different positions in the direction of the width of said tape-shaped recording medium in the lengthwise direction of the same, all of said n-pieces of fixed erasing heads being arranged so that the traced loci respectively traced by a pair of fixed heads adjoining each other in the direction of the width of said tape-shaped recording medium will be partially overlapped; and
    (c) control means for individually controlling the erasing operations of said n-pieces of fixed heads.

4. An apparatus according to claim 3, wherein said n-pieces of fixed erasing heads are all arranged so that a pair of fixed heads adjoining each other in the direction of the width of said tape-shaped recording medium are placed at positions so as to be shifted from each other in the lengthwise direction of said medium.

5. An apparatus according to claim 4, wherein said n-pieces of fixed erasing heads are arranged in a zigzag manner in the direction of the width of the tape-shaped recording medium.

6. An information signal recording apparatus, comprising:
    (a) a cylindrical member having formed in the outer peripheral surface thereof a guide portion for guiding a tape-shaped record bearing medium;
    (b) a recording heat rotatable relative to said cylindrical member for recording information signals on the tape-shaped record bearing medium as guided by said outer peripheral surface; and
    (c) an erase head fixedly secured to said cylindrical member to erase the signal recorded on the tape-shaped record bearing medium on the outer peripheral surface of said cylindrical member.

7. An apparatus according to claim 6, wherein said erase head is arranged to be able to erase the entire width of said tape-shaped record bearing medium.

8. An apparatus according to claim 7, wherein said erase head consists of a plurality of head elements arranged to trace different lateral positions of said tape-shaped record bearing medium.

* * * * *